United States Patent
Halder

(10) Patent No.: US 11,280,238 B2
(45) Date of Patent: Mar. 22, 2022

(54) HONEYCOMB BODY WITH RADIAL HONEYCOMB STRUCTURE HAVING TRANSITION STRUCTURAL COMPONENT AND EXTRUSION DIE THEREFOR

(71) Applicant: Corning Incorporated, Corning, NY (US)

(72) Inventor: Amit Halder, Corning, NY (US)

(73) Assignee: Corning, Incorporated, Corning, NY (US)

( * ) Notice: Subject to any disclaimer, the term of this patent is extended or adjusted under 35 U.S.C. 154(b) by 59 days.

(21) Appl. No.: 16/642,422

(22) PCT Filed: Aug. 28, 2018

(86) PCT No.: PCT/US2018/048229
§ 371 (c)(1),
(2) Date: Feb. 27, 2020

(87) PCT Pub. No.: WO2019/046229
PCT Pub. Date: Mar. 7, 2019

(65) Prior Publication Data
US 2020/0254433 A1    Aug. 13, 2020

Related U.S. Application Data

(60) Provisional application No. 62/550,866, filed on Aug. 28, 2017.

(51) Int. Cl.
*F01N 3/022* (2006.01)
*B01J 35/04* (2006.01)
(Continued)

(52) U.S. Cl.
CPC ......... *F01N 3/0222* (2013.01); *B01D 53/885* (2013.01); *B01J 35/04* (2013.01);
(Continued)

(58) Field of Classification Search
None
See application file for complete search history.

(56) References Cited

U.S. PATENT DOCUMENTS 3,885,977 A    5/1975    Lachman et al.
4,877,766 A    10/1989    Frost
(Continued)

FOREIGN PATENT DOCUMENTS

CN    204703990 U    10/2015
CN    204865865 U    12/2015
(Continued)

OTHER PUBLICATIONS

Chinese Patent Application No. 201880056258, Office Action dated Apr. 9, 2021; 8 pages (3 pages of English Translation and 5 pages of Original Document)); Chinese Patent Office.
(Continued)

*Primary Examiner* — David Sample
*Assistant Examiner* — Elizabeth Collister
(74) *Attorney, Agent, or Firm* — Joseph M. Homa

(57) ABSTRACT

Honeycomb bodies, honeycomb structures and extrusion dies, including a transition structural component. A honeycomb structure (100) includes a plurality of interconnected webs (106) defining a plurality of cell channels (108) in a honeycomb matrix (109) having a central axis (110) orthogonal to its transverse cross-section. Radial webs (116) diverge outwardly from the central axis (110). Radial webs (116) include a first radial web (150) and a second radial web (152). Tangential webs (120) are arranged concentrically with respect to the central axis (110), wherein at least one of the tangential webs (120) is a tangential transition web (142). At least one transition structural component (140) is located radially inward from the tangential transition web (124) and includes a first inclined web (144) having a first (Continued)

end (144A) coupled to the first radial web (150) and a second inclined web (146) having a first end (146A) coupled to the second radial web (152). Extrusion dies configured to make the honeycomb structures are provided, as are other aspects.

20 Claims, 6 Drawing Sheets

(51) Int. Cl.
*C04B 38/00* (2006.01)
*B29C 48/11* (2019.01)
*B29C 48/30* (2019.01)
*B01D 53/88* (2006.01)

(52) U.S. Cl.
CPC .......... *B29C 48/11* (2019.02); *B29C 48/3003* (2019.02); *C04B 38/0009* (2013.01); *B01D 2255/92* (2013.01)

(56) References Cited

U.S. PATENT DOCUMENTS

| | | | |
|---|---|---|---|
| 5,332,703 | A | 7/1994 | Hickman |
| 5,641,332 | A | 6/1997 | Faber et al. |
| 6,221,308 | B1 | 4/2001 | Peng |
| 6,259,078 | B1 | 7/2001 | Araya |
| 6,391,813 | B1 | 5/2002 | Merkel |
| 6,541,407 | B2 | 4/2003 | Beall et al. |
| 6,673,300 | B2 | 1/2004 | Allen et al. |
| 7,017,278 | B2 | 3/2006 | Kato |
| 7,596,885 | B2 | 10/2009 | Adrian et al. |
| 8,974,724 | B2 | 3/2015 | Day et al. |
| 9,005,517 | B2 | 4/2015 | Bronfenbrenner et al. |
| 9,038,284 | B2 | 5/2015 | Feldman et al. |
| 9,156,742 | B2 * | 10/2015 | Hayashi ............... B01D 46/247 |
| 9,335,093 | B2 | 5/2016 | Feldman et al. |
| 9,446,560 | B2 | 9/2016 | Bronfenbrenner et al. |
| 9,452,578 | B2 | 9/2016 | Bronfenbrenner et al. |
| 9,566,544 | B2 | 2/2017 | Iwasaki et al. |
| 9,731,229 | B2 | 8/2017 | Lescoche |
| 2007/0231533 | A1 | 10/2007 | Aniolek et al. |
| 2010/0037573 | A1 | 2/2010 | Komori et al. |
| 2014/0084505 | A1 | 3/2014 | Vileno |
| 2015/0275726 | A1 * | 10/2015 | Tamai ................ B01D 46/2451 428/116 |
| 2018/0326343 | A1 | 11/2018 | Beall et al. |

FOREIGN PATENT DOCUMENTS

| | | |
|---|---|---|
| EP | 0352015 A1 | 1/1990 |
| EP | 0463654 A2 | 1/1992 |
| EP | 2380863 A1 | 10/2011 |
| EP | 2835165 A1 | 2/2015 |
| JP | 02-072922 A | 3/1990 |
| JP | 06023215 A | 2/1994 |
| JP | 2000-300998 A | 10/2000 |
| JP | 2002-519186 A | 7/2002 |
| JP | 2009-085202 A | 4/2009 |
| JP | 2009-532605 A | 9/2009 |
| JP | 2015-194119 A | 11/2015 |
| JP | 2016-101587 A | 6/2016 |
| WO | 2007/126712 A1 | 11/2007 |
| WO | 2008/066765 A1 | 6/2008 |
| WO | 2011/110780 A1 | 9/2011 |
| WO | 2014/046912 A1 | 3/2014 |
| WO | 2017/040138 A1 | 3/2017 |

OTHER PUBLICATIONS

Japanese Patent Application No. 2020-511980, Office Action dated May 12, 2021, 4 pages (English Translation Only), Japanese Patent Office.

International Search Report and Written Opinion of the International Searching Authority; PCT/US2018/048229; dated Nov. 9, 2018; 7 Pages; European Patent Office.

* cited by examiner

HONEYCOMB BODY WITH RADIAL HONEYCOMB STRUCTURE HAVING TRANSITION STRUCTURAL COMPONENT AND EXTRUSION DIE THEREFOR

CROSS-REFERENCE TO RELATED APPLICATIONS

This application is a National Stage application under 35 U.S.C. § 371 of International Application No. PCT/US2018/048229 filed on Aug. 28, 2018 which claims the benefit of priority under 35 U.S.C. § 119 of U.S. Provisional Application Ser. No. 62/550,866, filed on Aug. 28, 2017, the contents of which are relied upon and incorporated herein by reference in their entireties.

FIELD

Embodiments of the disclosure relate to honeycomb bodies comprising honeycomb structures, and more particularly to radial honeycomb structures, for use in engine exhaust systems, such as particulate filters and catalytic converters.

BACKGROUND

Honeycomb bodies have been used in catalytic converters and particulate filters for engine exhaust after-treatment. The honeycomb bodies may be manufactured by extruding a mixture of inorganic and organic materials and a liquid vehicle, such as water, through an extrusion die of an extruder.

The honeycomb structures of the honeycomb bodies have a plurality of interconnecting webs that may be very thin which may be subjected to stress in manufacturing processes and handling before the extruded honeycomb structures are fired, during canning, and in use.

SUMMARY

In one aspect, a honeycomb body is disclosed herein comprising a honeycomb structure comprised of a plurality of interconnected webs defining a plurality of cell channels in a honeycomb matrix having a central axis orthogonal to its transverse cross section, the plurality of interconnected webs comprising: radial webs arranged to diverge from one another with respect to the central axis (i.e. the radial webs diverge outwardly from the central axis) as the radial webs extend toward an outermost periphery of the honeycomb structure, the radial webs comprising a first radial web and a second radial web; tangential webs arranged concentrically with respect to the central axis, wherein at least one of the tangential webs is a tangential transition web and is located between two adjacent radial webs; and at least one transition structural component located radially inward from the tangential transition web, wherein the at least one transition structural component comprises a first inclined web having a first end coupled to the first radial web and a second inclined web having a first end coupled to the second radial web.

In another aspect, a honeycomb body is disclosed herein comprising a honeycomb structure comprised of a plurality of interconnected webs defining a plurality of cell channels in a honeycomb matrix having a central axis orthogonal to its transverse cross-section, the plurality of interconnected webs comprises: radial webs arranged to diverge from one another with respect to the central axis as the radial webs extend toward an outermost periphery of the honeycomb structure, the radial webs comprising a first radial web and a second radial web; tangential webs arranged concentrically with respect to the central axis, wherein at least one of the tangential webs is a tangential transition web and is located between two adjacent radial webs; and at least one transition structural component bounded by the tangential transition web, the first radial web, and the second radial web, wherein the at least one transition structural component comprises: a first inclined web having a first end and a second end, wherein the first end is coupled to the first radial web; a second inclined web having a first end and a second end, wherein the first end is coupled to the second radial web, and a radially-extending web having a first end and a second end, the first end coupled to the tangential transition web and the second end coupled to the second end of the first inclined web and the second end of the second inclined web.

In yet another aspect, an extrusion die is disclosed herein comprising an outlet face of a die body having a central axis orthogonal to the outlet face and comprising a matrix of intersecting slots comprising: radial slots arranged to diverge from one another with respect to the central axis as the radial slots extend toward an outermost periphery of the die body, the radial slots comprising a first radial slot and a second radial slot; tangential slots arranged concentrically with respect to the central axis, wherein at least one of the tangential slots is a tangential transition slot and is located between two adjacent radial slots; and at least one transition structural component located radially inward from the tangential transition slot, wherein the at least one transition structural component comprises a first inclined slot having a first end coupled to the first radial slot and a second inclined slot having a first end coupled to the second radial slot.

Numerous other aspects are provided in accordance with these and other embodiments of the disclosure. Other features and aspects of embodiments of the disclosure will become more fully apparent from the following detailed description, the claims, and the accompanying drawings.

BRIEF DESCRIPTION OF THE FIGURES

The drawings, described below, are for illustrative purposes and are not necessarily drawn to scale. The drawings are not intended to limit the scope of the disclosure in any way.

DETAILED DESCRIPTION

Figure 1A:
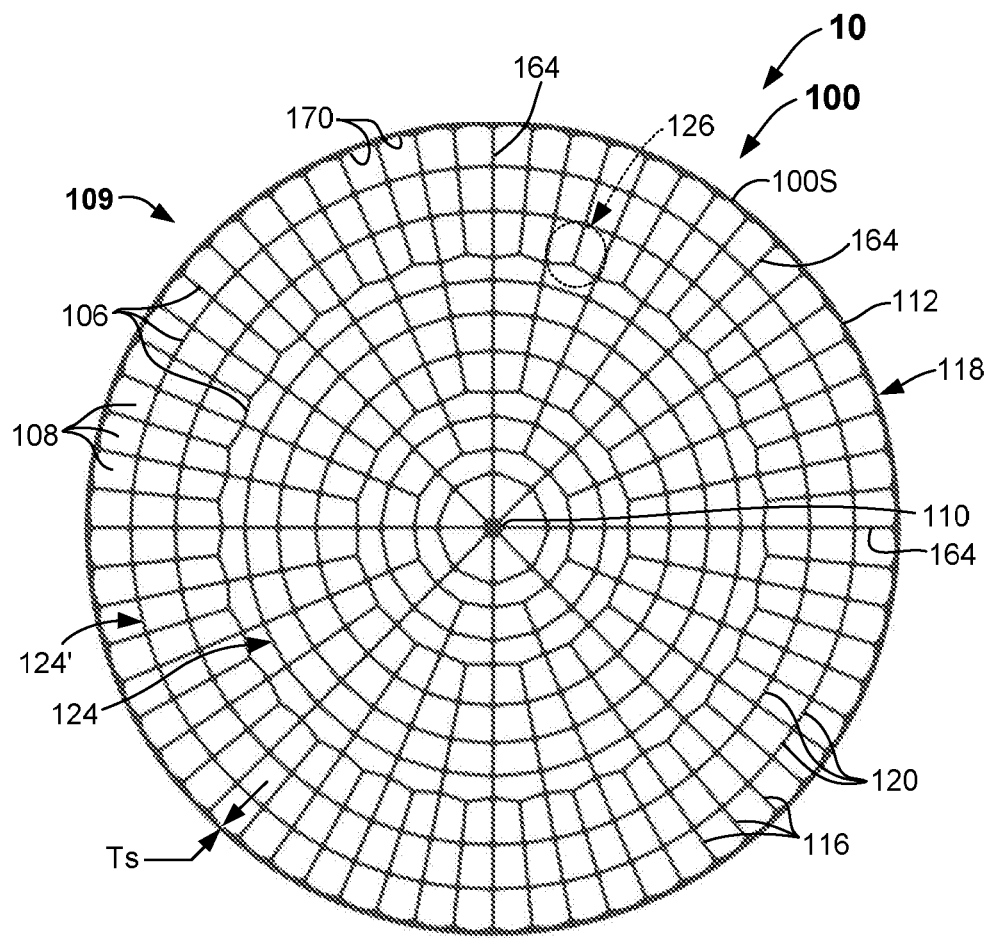
FIG. 1A schematically illustrates an end view of an inlet side of a honeycomb body comprising honeycomb structure according to embodiments disclosed herein.

Reference will now be made in detail to the example embodiments of this disclosure, which are illustrated in the accompanying drawings. Wherever possible, the same reference numbers will be used throughout the drawings to refer to the same or like parts throughout the several views. Features of the various embodiments described herein may be combined with each other, unless specifically noted otherwise.

As used herein "honeycomb structure" of a honeycomb body comprises a honeycomb matrix of intersecting walls, or webs, such that the honeycomb body may be configured to be accepted into and used in a can or housing. The webs of the honeycomb structure may be comprised of a porous material comprising open and interconnected pores, such as porous ceramic material. The honeycomb matrix comprises a plurality of cell channels, in some embodiments preferably parallel cell channels, formed by the intersecting walls or webs. The honeycomb body may be embodied as a flow through catalyst support, for example wherein no channels are plugged, or as a particulate filter wherein the honeycomb body further comprises plugs in some or all of the channels (e.g., inlet cell channels comprising plugs spaced away from the inlet end of the honeycomb body (such as plugs disposed at or near the outlet end), and/or outlet cell channels comprising plugs spaced away from the outlet end of the honeycomb body (such as plugs disposed at or near the inlet end)).

High isostatic strength is an advantage for such honeycomb bodies and honeycomb structures, including porous ceramic honeycomb structures. Honeycomb structures having relatively-high isostatic strength are better able to withstand pressure applied to the honeycomb bodies, such as canning pressure, for example. Although thin webs enhance the performance of devices, such as catalytic converters and exhaust filters with honeycomb structures, as the webs become thinner, the strength (e.g., isostatic strength) of the resulting honeycomb structures may be reduced, and the relatively-thin webs may reduce the ability of honeycomb structures to withstand high forces applied in various directions, such as radial and other compression forces and the like applied to the honeycomb bodies such as during canning procedures.

The honeycomb bodies disclosed herein with radial honeycomb structures, with radially-oriented cell channel geometry, may provide strength advantages over traditional square cell channel honeycomb matrices. The radial honeycomb matrices and structures disclosed herein can provide further strength improvements to traditional radial honeycomb structures with radially-oriented cell channel geometry.

In accordance with one or more embodiments of the disclosure, a honeycomb body comprises a honeycomb structure which provides increased strength (e.g., isostatic strength). In some embodiments, the honeycomb structure provides increased strength with thin and ultra-thin webs so as to be better able to withstand high forces (e.g., radial compression or other forces) applied to the honeycomb body during canning and other manufacturing processes. For example, one or more embodiments may benefit from improved structural rigidity of the honeycomb structure in a green state, as well as in the fired state.

In some embodiments the honeycomb body comprises a honeycomb structure comprising intersecting webs configured in a matrix. Some of the webs are radial webs that are arranged radially with respect to a central axis extending orthogonally relative to a transverse cross-section of the honeycomb structure. Other webs of the matrix are tangential webs that may be arranged concentrically with respect to the central axis. The intersecting webs form cell channels that extend parallel to each other in an axial direction between an inlet face and an outlet face of the honeycomb structure. The honeycomb structure may further comprise transition structural components such as inclined webs. Other structural and microstructural attributes of embodiments of the honeycomb structure web configuration providing one or more of the afore-mentioned performance benefits are described fully herein.

Other embodiments of the present disclosure include particulate filters and catalytic converters comprise honeycomb bodies comprising the honeycomb structures disclosed herein, as well as exhaust systems comprising such particulate filters and/or catalytic converters, extrusion dies for manufacturing the honeycomb structures, as well as methods of manufacturing the honeycomb bodies and honeycomb structures, as are other aspects and features.

Further details of example honeycomb bodies and honeycomb structures, particulate filters, exhaust systems that comprise such particulate filters and catalytic converters, extrusion dies for manufacturing the honeycomb structures, and methods of filtering particulates and manufacturing of the honeycomb structures are described with reference to FIGS. 1A-5B herein.

Figure 1B:
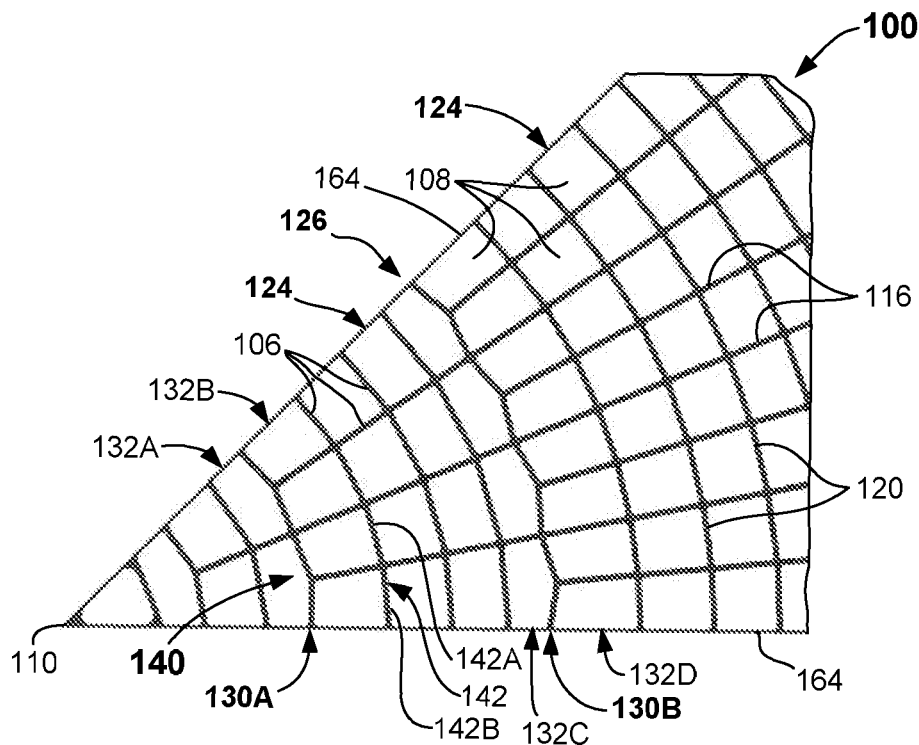
FIG. 1B schematically illustrates an enlarged partial view of the honeycomb body comprising honeycomb structure of FIG. 1A showing details of transition structural components according to embodiments disclosed herein.

FIG. 1A illustrates an end view a honeycomb body 10 comprising honeycomb structure 100, for example FIG. 1A may schematically illustrate an inlet side of a honeycomb structure 100 of a honeycomb body 10 according to embodiments disclosed herein. FIG. 1B illustrates a partial view of the honeycomb structure 100 of FIG. 1A. in some embodiments, the honeycomb structure 100 is a substrate support such as for carrying a catalyst in a catalytic converter, such that the catalytic converter can be used in an exhaust stream of an internal combustion engine to remove unwanted emissions from the exhaust stream. In some embodiments, the honeycomb structure 100 is a thin-walled radial honeycomb structure. In some embodiments, a honeycomb body comprising honeycomb structure 100 is a particulate filter, which is used for filtering particulates (e.g., soot and/or inorganics) from a flow stream, such as from an engine exhaust stream of an internal combustion engine (e.g., gasoline or diesel engine).

A honeycomb body 10 comprising honeycomb structure 100 comprises a plurality of interconnected webs 106 (a few labeled) defining a plurality of cell channels 108 (a few labeled) arranged in a honeycomb matrix 109. In some embodiments, the webs 106 are comprised of a porous material such that the webs 106 comprise interconnected pores which provide an internal porosity with open pores extending between a first surface and a second surface. In some embodiments, the honey comb body further comprises a catalyst material which is present within at least part of the internal porosity and/or as a coating and/or washcoat, which preferably comprises its own porosity, wherein the porous webs provide an anchor therefor. In filter embodiments, the porosity of the honeycomb body enable exhaust gas to pass through the webs 106. The webs 106 are preferably comprised of a porous ceramic, or other suitable porous material, that can withstand high temperatures in use. For example, the webs 106 may be made of a ceramic material such as cordierite, silicon carbide (SiC), aluminum titanate, mullite, alumina ($Al_2O_3$), silicon aluminum oxynitride ($Al_6O_2N_6Si$), zeolite, combinations of the afore-mentioned, and the like. Other suitable porous materials may be used, such as fused silica, porous metal, or combinations thereof.

In some embodiments, the honeycomb structure 100 comprising webs 106 may be formed during an extrusion process wherein a mixture of inorganic components, organic components, and a liquid vehicle (e.g., water) are extruded through a honeycomb extrusion die and then dried. The honeycomb structure 100 may then be fired to form a desired ceramic or glass-ceramic structure, such as by sintering or solid phase reaction sintering. Other known methods of manufacture of honeycomb structures may be used. In some embodiments, various selected channels 108 of the honeycomb structure 100 may then be plugged in a defined plugging pattern. Plugging may be accomplished as described in U.S. Pat. No. 6,673,300 to Allen et al. In other embodiments, a dried green honeycomb structure may be plugged and then fired, or partially fired, plugged, and fired again. In some embodiments, a honeycomb body 10 comprising honeycomb structure 100 is a catalyst support and may be coated with one or more catalyst coatings for use in a catalytic converter.

The honeycomb structure 100 may have a central axis 110 extending orthogonal to its transverse cross-section, such as through a geometric center of the transverse cross-section. In the views of FIGS. 1A and 1B, the central axis 110 extends orthogonal to the figures. The cell channels 108 extend axially in parallel to the central axis 110. The outermost cross-sectional outline of the transverse cross-section of the honeycomb structure 100 may be a circle, an ellipse, an oval, a racetrack shape, a tri-lobed shape, or a rectangle, however the honeycomb structure 100 is not limited to these cross-sectional shapes. As described herein, some of the webs 106 are arranged to diverge from one another with respect to the central axis 110 (e.g., radial webs). Additionally, some of the webs 106 are arranged concentrically with respect to the central axis 110 (e.g., tangential webs).

The honeycomb structure 100 preferably comprises an outermost peripheral wall or skin 112 on an outermost periphery 118 providing an outer peripheral surface 100S of the honeycomb structure 100. In some embodiments skin 112 is extruded along with webs 106 during the extrusion of the honeycomb structure 100. In other embodiments, skin 112 is applied to the honeycomb structure 100 at some point after extrusion thereof (an after-applied skin), e.g., applied as ceramic-based skin cement onto the outside surface (e.g., machined periphery) of a fire ceramic honeycomb structure or green honeycomb structure. In some embodiments, skin 112 has a minimum skin thickness Ts that may vary slightly as described herein about the radial periphery of the honeycomb structure 100; in some embodiments the skin thickness Ts is between about 0.1 mm and 100 mm, or even between 1 mm and 10 mm, for example. Other skin thicknesses Ts may be used. Apparatus and methods for skinning articles, such as honeycomb structures are described in U.S. Pat. No. 9,132,578, for example. Other suitable skinning methods may be used.

The honeycomb body 10 comprising honeycomb structure 100 comprises radial webs 116 (a few labeled) in an arrangement of radial webs 116 divergent from one another in a direction from the central axis 110 toward the outermost periphery 118 of the honeycomb structure 100. The honeycomb body 10 comprising honeycomb structure 100 further comprises tangential webs 120 (a few labeled) in an arrangement of tangential webs disposed concentrically with respect to the central axis 110. The tangential webs 120 may extend between radial webs 116 and, in some embodiments, form concentric rings 124 with respect to the central axis 110. In some embodiments, the thickness of the radial webs 116 is the same as one or more of the tangential webs 120. In some embodiments, the radial webs 116 and the tangential webs 120 have thicknesses of less than or equal to 0.015 inch (0.381 mm), less than or equal to 0.010 inch (0.254 mm), less than or equal to 0.005 inch (0.127 mm), or even less. In some embodiments, the radial webs 116 and the tangential webs 120 have thicknesses of greater than or equal to 0.001 inch (0.025 mm). In other embodiments, the radial webs 116 and the tangential webs 120 have thicknesses between 0.001 inch (0.025 mm) and 0.002 inch (0.051 mm). The radial webs 116 and the tangential webs 120 may have other thicknesses, and may have different thicknesses from one another.

In some embodiments, one or more tangential webs 120 are straight, meaning that the one or more tangential webs 120 extend in a straight line between two adjacent radial webs 116. In some embodiments, all the tangential webs 120 are straight.

The straight tangential webs 120 can improve the ability of the honeycomb structure 100 to handle compressive loads and stresses. In contrast, honeycomb structures with curved tangential webs may have cell channels located in the center with a significant curvature. The curvature may make the webs weak and may therefore reduce their ability to withstand compressive loads; for example, under isostatic compressive pressure, radial webs may be compressed in length towards the center of the honeycomb structure and pull curved tangential webs along, which also imparts compressive stress on the curved tangential webs. The curved tangential webs may not be able to carry the compressive stress and they may bend, collapse, and/or fracture. On the other hand, honeycomb bodies comprising honeycomb structure 100 of the present disclosure may withstand higher forces before the webs 106, and in particular, the tangential webs 120 collapse. The tangential webs 120 that are straight can also stiffen the honeycomb body 10 comprising honeycomb structure 100 in both tangential and radial directions, which can further strengthen the overall honeycomb structure 100 of the honeycomb body 10 in both the green and fired states. Additionally, straight tangential webs 120 can help simplify die manufacturing and extrusion processes relative to honeycomb structures implementing curved tangential webs.

The honeycomb structure 100 preferably comprises one or more transition structural components 126. The transition structural components 126 aid in providing a change to the number of cell channels 108 between concentric rings 124, 124' of cell channels 108 that abut the transition structural components 126. Without transition structural components 126, the cross-sectional areas of cell channels 108 in the outer rings 124' would be very large and the cross-sectional areas of cell channels 108 in the inner rings 124 would be very small.

The honeycomb body 10 comprising honeycomb structure 100 shown in FIGS. 1A and 1B comprises a first transition ring 130A and a second transition ring 130B. The first transition ring 130A allows for an increase in (e.g., doubles) the number of cell channels 108 between a first ring 132A and a second ring 132B of the first transition ring 130A. The second transition ring 130B allows for an increase in (e.g., doubles) the number of cell channels 108 between a third ring 132C and a fourth ring 132D of cell channels 108. The number of transition rings in a honeycomb structure may vary depending on various design features and the size of the face of the honeycomb structure 100.

Figure 1C:
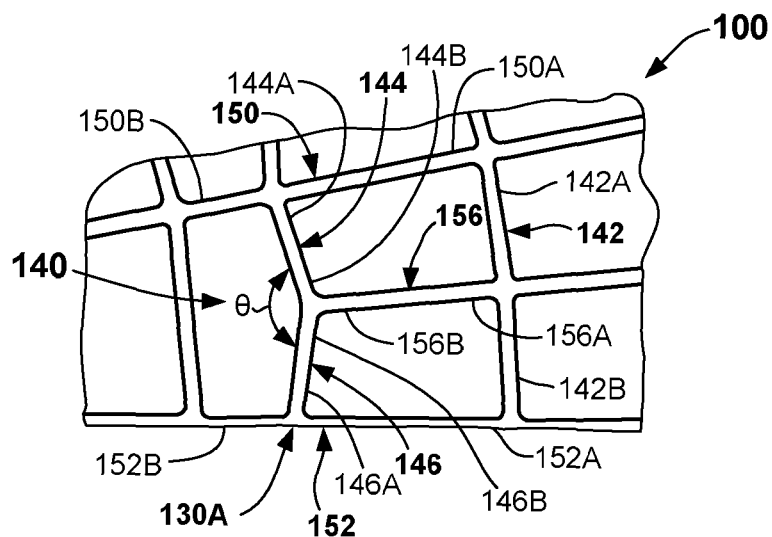
FIG. 1C schematically illustrates an enlarged partial view showing a transition structural component of the honeycomb body comprising honeycomb structure of FIGS. 1A and 1B according to embodiments disclosed herein.

The first transition ring 130A and the second transition ring 130B may comprise a plurality of transition structural components 126. Reference is made to FIGS. 1B and 1C and the first transition ring 130A, which comprises transition structural components 140 that are similar in structure as transition structural components 126 in the second transition ring 130B. FIG. 1C shows an enlarged view of the transition structural component 140. The transition structural component 140 may be located radially inward from a tangential transition web 142 that may comprise a first web segment 142A and a second web segment 142B. The first web segment 142A and the second web segment 142B may both be straight webs. The transition structural component 140 may comprise a first inclined web 144 comprising a first end 144A and a second end 144B. The transition structural component 140 may also comprise a second inclined web 146 having a first end 146A and a second end 146B.

The transition structural component 140 may be adjacent a first radial web 150 that may comprise a first web segment 150A and a second web segment 150B. The transition structural component 140 may also be adjacent a second radial web 152 comprising a first web segment 152A and a second web segment 152B. The first end 144A of the first inclined web 144 may be coupled to the first radial web 150 at an inclined angle. An inclined angle is an angle other angles that tangential webs 120 outside of the transition rings couple to radial webs 116. An inclined angle is less than ninety degrees between the first inclined web 144 and the first web segment 150A of the first radial web 150. The first end 144A of the first inclined web 144 may be coupled to the first radial web 150 at the intersection of the first web segment 150A and the second web segment 150B. The first end 146A of the second inclined web 146 may be coupled to the second radial web 152, such as at the intersection of the first web segment 152A and the second web segment 152B. Likewise, an inclined angle between the second inclined web 146 and the first web segment 152A of the second radial web 152 is less than ninety degrees. The first inclined web 144 and/or the second inclined web 146 may have thicknesses equal to the thicknesses of the first radial web 150 and/or the tangential transition web 142. The first inclined web 144 and the second inclined web 146 may have the same thickness.

The transition structural component 140 shown in FIGS. 1A-1C may comprise a radially-extending web 156 comprising a first end 156A and a second end 156B. The first end 156A may be coupled to the tangential transition web 142, such as between the first web segment 142A and the second web segment 142B. The second end 156B of the radially-extending web 156 may be coupled to the second end 144B of the first inclined web 144 and also to the second end 146B of the second inclined web 146. The first inclined web 144 and the second inclined web 146 may intersect to form an angle θ, which may be less than one-hundred eighty degrees. In some embodiments, the angle θ may be between one-hundred twenty degrees and one-hundred sixty degrees.

A honeycomb body 10 with honeycomb structure 100 can provide many improvements in strength relative to traditional honeycomb structures. For example, in some embodiments, there may not be tangential webs 120 located directly radially inward or outward of the first inclined web 144 and the second inclined web 146. Accordingly, the transition structural component 140 may be devoid of a tangential web 120 extending between the first radial web 150 and the second radial web 152 and the intersection of second ends 144B, 146B. This configuration of inclined webs transfers and distributes loads from radial webs to neighboring webs. The transfer and distribution of loads increases the radial stiffness of the honeycomb structure 100 and enables the webs 106 to be made thinner in the honeycomb structure 100.

In some aspects, one or more radial webs may extend from the central axis 110 to the outermost periphery 118 of the honeycomb structure 100. For example, the embodiment shown in FIGS. 1A and 1B comprises one or more long radial webs 164 extending between the central axis 110 and the outermost periphery 118. The long radial webs 164 may provide additional strength for the honeycomb structure 100.

An outermost ring of tangential webs 120 on the outermost periphery 118 of the honeycomb structure 100 may comprise inner surfaces 170 facing the central axis 110 that are concave. The inner surfaces 170 may increase the strength of the honeycomb structure 100.

Figure 1D:
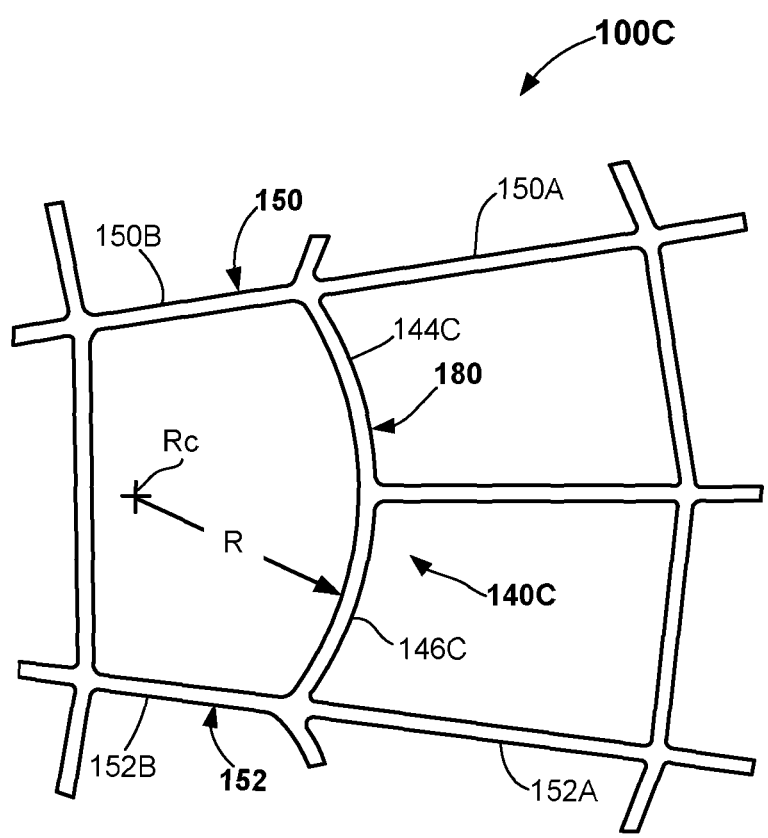
FIG. 1D schematically illustrates an enlarged partial view showing an alternative transition structural component comprising a curved incline according to embodiments disclosed herein.

FIG. 1D illustrates an embodiment of an alternative transition structural component 140C comprising a curved tangential web 180. A first inclined web 144C and a second inclined web 146C may be curved to form the curved tangential web 180. The curved tangential web 180 may provide improved strength to the honeycomb structure 100C. In some embodiments, the curved tangential web 180 may comprise two or more web segments and may form a continuous curve. The curved tangential web 180 may have a radius R that may, in some embodiments, be a compound radius. Alternatively, each of the first inclined web 144C and the second inclined web 146C may have different radius centers, other than the common center Rc shown. A suitable dimension for radius R may be used, such as between 1.0 mm and 2.7 mm, for example. In some embodiments, the minimum radius R may be greater than or equal to half the length of the distance between adjoining radial webs 150 and 152. For example, the minimum radius R may be greater than or equal to half the distance between a point on the second web segment 150B located furthest from the first web segment 150A and a point on the second web segment 152B located furthest from the first web segment 152A.

Figure 2A:
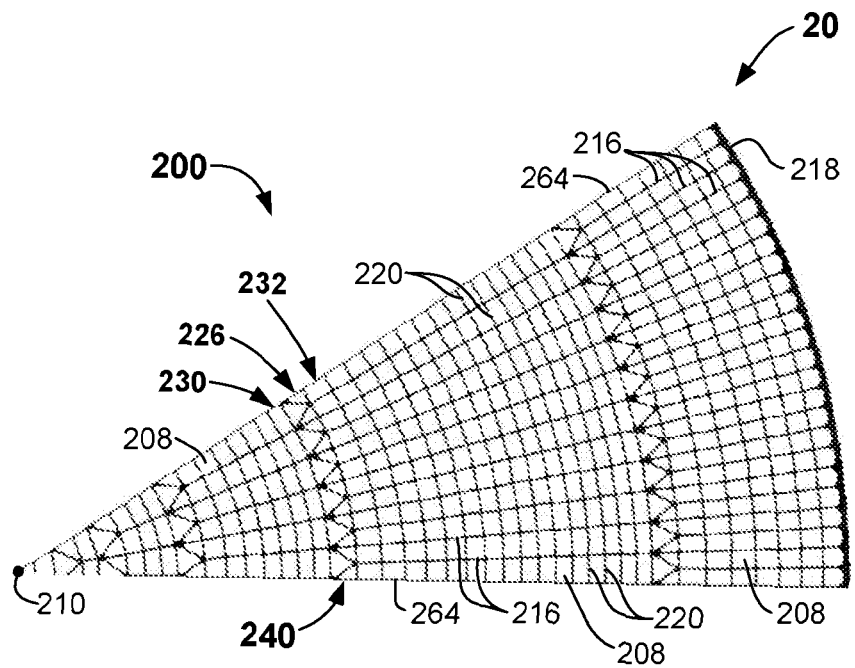
FIG. 2A schematically illustrates a partial front view of a honeycomb body comprising honeycomb structure according to embodiments disclosed herein.
Figure 2B:
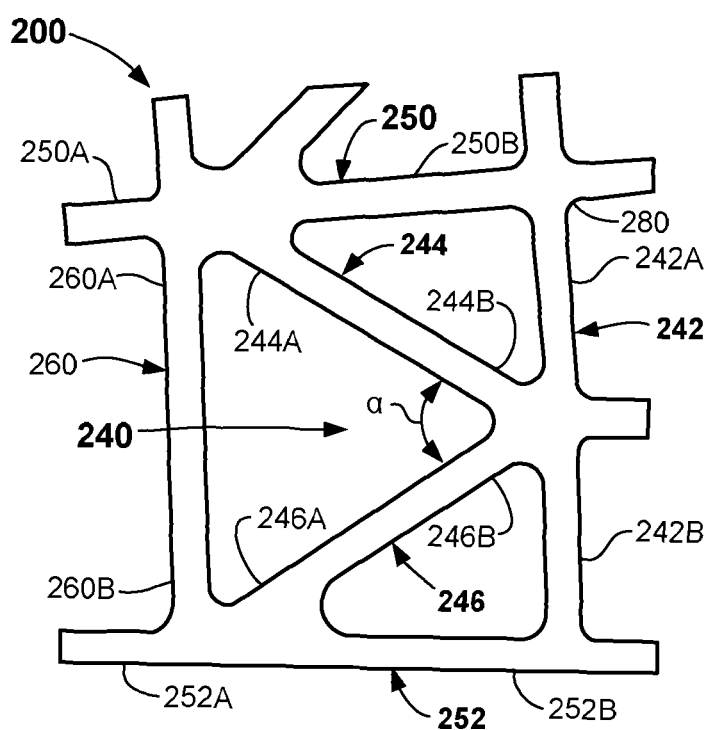
FIG. 2B schematically illustrates an enlarged view of a transition structural component of the honeycomb body comprising honeycomb structure of FIG. 2A according to embodiments disclosed herein.

FIG. 2A illustrates a partial front view of another embodiment of a honeycomb body 20 comprising honeycomb structure 200 comprising a different transition structural component than the transition structural component 140 shown in FIGS. 1A-1C. FIG. 2B illustrates an enlarged view of a transition structural component 240 used in the honeycomb structure 200 (shown as a dot). The honeycomb body 20 comprising honeycomb structure 200 comprises a central axis 210 with radial webs 216 (a few labeled) arranged to diverge from one another with respect to the central axis 210 as the radial webs 216 extend toward an outermost periphery 218 of the honeycomb structure 200. The honeycomb structure 200 further comprises tangential webs 220 (a few labeled) arranged concentrically with respect to the central axis 210. One or more of the tangential webs 220 may be straight, such as extending in a straight line between adjacent radial webs 216. In some embodiments, all the tangential webs 220 in one or more concentric rings are straight. In some embodiments, all the tangential webs 220 are straight.

The honeycomb body 20 comprising honeycomb structure 200 may comprise one or more transition rings. Reference is made to a transition ring 226 that increases (e.g., doubles) the number of cell channels 208 between a first ring 230 and a second ring 232 of cell channels 208. The transition rings 226 may comprise one or more transition structural components, such as a transition structural component 240. Referring to FIG. 2B, the transition structural component 240 may be located radially inward from a tangential transition web 242 that may comprise a first web segment 242A and a second web segment 242B. The first web segment 242A and the second web segment 242B may be individual tangential webs, and they both may be straight. The transition structural component 240 may comprise a first inclined web 244 comprising a first end 244A and a second end 244B. The transition structural component 240 may also comprise a second inclined web 246 comprising a first end 246A and a second end 246B.

The transition structural component 240 may be adjacent a first radial web 250 that may comprise a first web segment 250A and a second web segment 250B. The transition structural component 240 may also be adjacent a second radial web 252 that may comprise a first web segment 252A and a second web segment 252B. The first end 244A of the first inclined web 244 may be coupled to the first radial web 250 at an inclined angle. The first end 244A of the first inclined web 244 may be coupled to a location on the first radial web 250 proximate the intersection of the first web segment 250A and the second web segment 250B. The first end 246A of the second inclined web 246 may be coupled to the second radial web 252, such as to a location proximate the intersection of the first web segment 252A and the second web segment 252B and at an inclined angle.

The second end 244B of the first inclined web 244 and the second end 246B of the second inclined web 246 may be coupled to the tangential transition web 242. In some embodiments, the second end 244B and the second end 246B may be coupled to the intersection of the first web segment 242A and the second web segment 242B of the tangential transition web 242. The intersection of the first inclined web 244 and the second inclined web 246 forms an angle α, which may be approximately one-hundred twenty degrees. In some embodiments, the angle α may be between ninety degrees and one-hundred fifty degrees. Other angles are possible.

In some embodiments, the transition structural component 240 may be bounded by or comprise an inner tangential web 260. The inner tangential web 260 comprises a first end 260A and a second end 260B. The first end 260A of the inner tangential web 260 may be coupled to the first radial web 250, such as proximate the first end 244A of the first inclined web 244. The second end 260B of the inner tangential web 260 may be coupled to the second radial web 252, such as proximate the first end 246A of the second inclined web 246.

In some aspects, as shown in FIG. 2A, one or more radial webs extend from the central axis 210 to the outermost periphery 218 of the honeycomb structure 200 to improve the strength of the honeycomb structure 200. For example, a radial web 264 may extend between the central axis 210 and the outermost periphery 218 and may provide additional strength for the honeycomb structure 200.

Further enhancements in strength may be accomplished by providing a fillet or chamfer at the intersections of some or all of the webs, such as at the webs in the transition structural components 140, 240. As shown in FIG. 2B, a fillet 280 is included to increase the strength of the honeycomb structure 200. The fillet may be applied to other intersections including all intersections of the transition structural components 140, 240 within the honeycomb structures 100, 200 as shown.

The honeycomb structures 100, 200 described above provide increased strength for honeycomb bodies relative to traditional radial honeycomb structures. The radial web configuration comprises complete cell channels near the outermost periphery 118, 218 of the honeycomb structures 100, 200, which can increase isometric strength and the ability of the honeycomb structures 100, 200 to withstand thermal shock, for example. The straight tangential webs 120, 220 increase the stiffness and isometric strength of the honeycomb structures 100, 200. The inclined webs 144, 146, 244, 246 can further increase the isometric strength. The aforementioned advantages allow honeycomb bodies with the honeycomb structures 100, 200 to have uniform web thickness or substantially uniform web thickness. The substantially uniform web thickness may reduce the time and cost of producing an extrusion die for extruding the honeycomb structures 100, 200.

Figure 3:
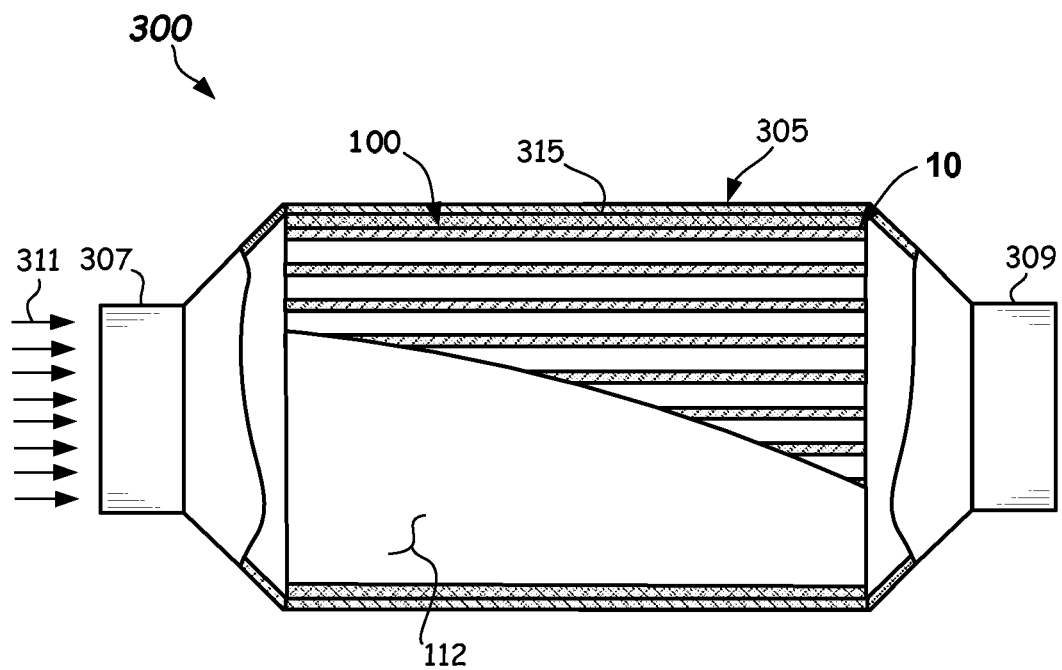
FIG. 3 schematically illustrates a partial cutaway view of a catalytic converter substrate comprising a honeycomb structure of FIG. 1A according to embodiments disclosed herein.

FIG. 3 shows a catalytic converter 300 comprising a honeycomb body 10 comprising honeycomb structure 100 or a honeycomb body 20 comprising honeycomb structure 200. The honeycomb body comprising honeycomb structure is disposed inside of a can 305, such as a metal housing or other confining structure. Can 305 may comprise a first end cap including an inlet 307 configured to receive engine exhaust 311 containing exhaust emissions (e.g., SOx and NOx), and a second end cap comprising an outlet 309 configured to exhaust a treated exhaust flow, such as where a large percentage of a targeted exhaust emission (e.g., SOx and NOx) in the engine exhaust 311 have been removed. Skin (for example skin 112 of the honeycomb structure 100) may have a cushion member 315 in contact therewith, such as a high-temperature insulation material, to cushion the honeycomb body from shock and stress. Any suitable construction of the cushion member 315 may be used, such as one-piece construction, or two or more layer construction. The honeycomb structure 100 and cushion member 315 may be received in the can 305 by any suitable means, such as by funneling into the central body and then one or more of the first and second end caps may be secured (e.g., welded) onto the central body to form the inlet 307 and the outlet 309. Other, two-piece construction or clam-shell construction of the can 305 may optionally be used.

Figure 4:
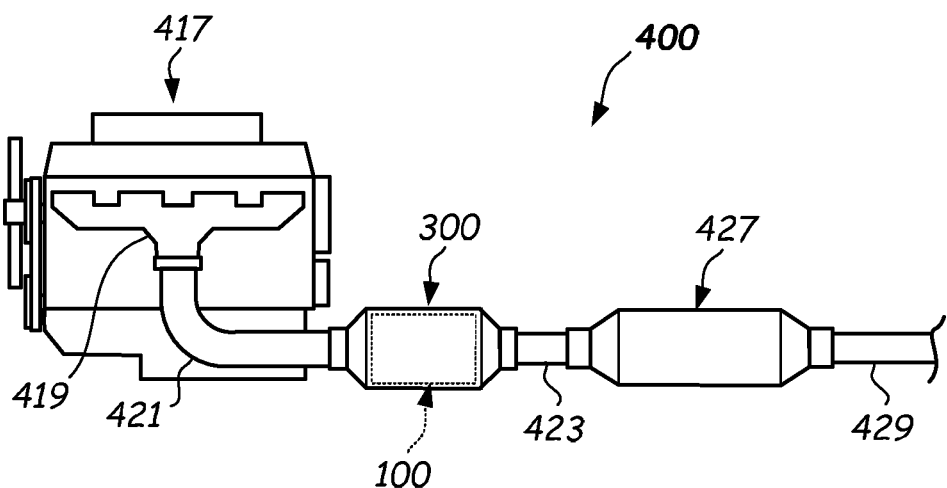
FIG. 4 schematically illustrates an exhaust system comprising the catalytic converter substrate comprising the honeycomb structure of FIG. 1A coupled to an engine according to embodiments disclosed herein.

FIG. 4 illustrates an exhaust system 400 coupled to an engine 417 (e.g., a gasoline engine or diesel engine). The exhaust system 400 may comprise a manifold 419 for coupling to the exhaust ports of the engine 417, a first collection tube 421 configured to couple between the manifold 419 and the catalytic converter 300 containing therein a honeycomb body comprising a honeycomb structure disclosed herein. Coupling may be by any suitable clamping bracket or other attachment mechanism. The first collection tube 421 may be integral with the manifold 419 in some embodiments. In some embodiments, the catalytic converter 300 may couple directly to the manifold without an intervening member. The exhaust system 400 may further comprise a second collection tube 423 coupled to the catalytic converter 300 and to a second exhaust component 427. The second exhaust component 427 may be a muffler, a resonator, a second catalytic converter, or even a particulate filter, for example. A tailpipe 429 (shown truncated) or other conduit or component may be coupled to the second exhaust component 427. Other exhaust system components may be included, such as oxygen sensors, ports for urea injection, and the like (not shown). The engine 417 may include one catalytic converter 300 for each bank (side set of cylinders) of the engine 417, or optionally, the first collection tube 421 may be a Y-tube collecting exhaust from each bank and directing the exhaust to the catalytic converter 300.

Figure 5A:
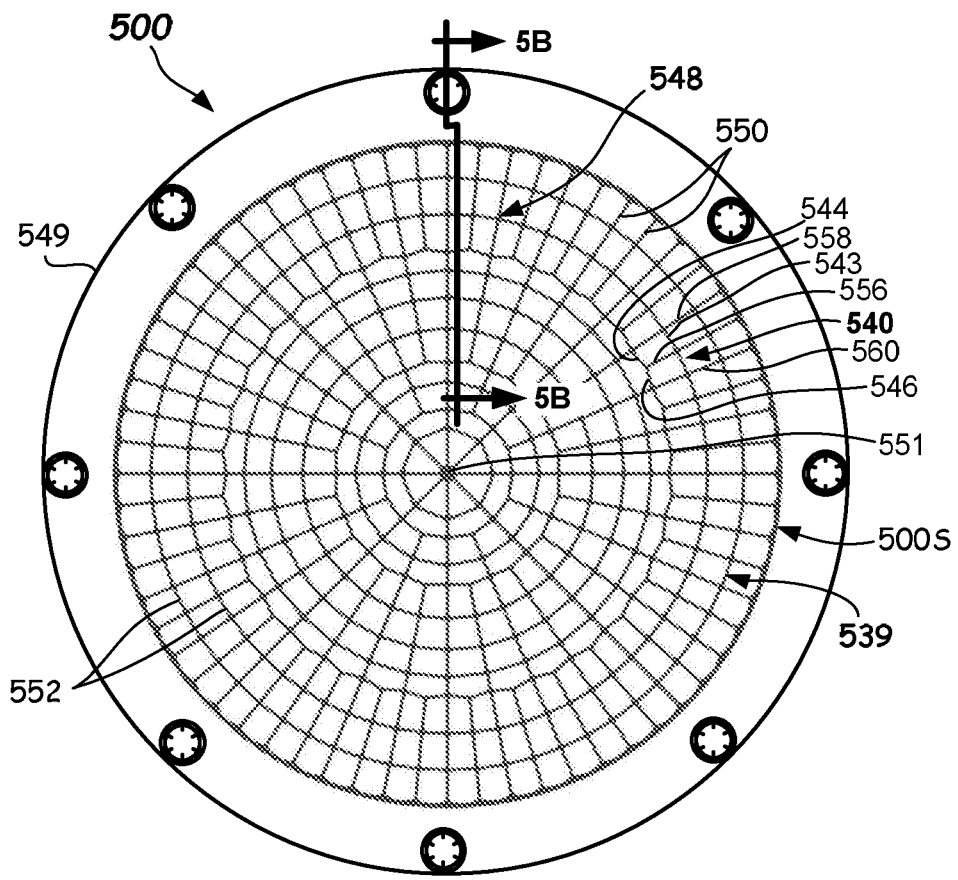
FIG. 5A schematically illustrates a front face of an extrusion die for extruding a honeycomb structure of FIGS. 1A-2B according to embodiments disclosed herein.
Figure 5B:
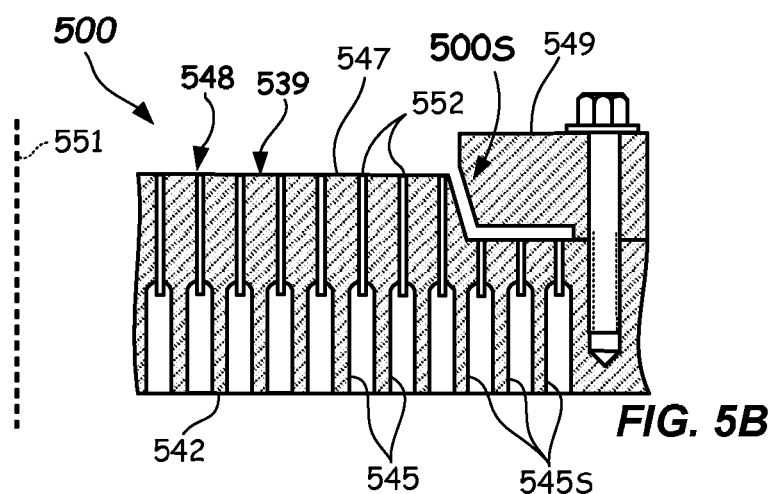
FIG. 5B schematically illustrates a partial cross-sectional view of the extrusion die of FIG. 5A taken along section line 5B-5B of FIG. 5A according to embodiments disclosed herein.

Referring now to FIGS. 5A and 5B, a honeycomb extrusion die 500 configured to manufacture a honeycomb body 10 with honeycomb structure 100 and according to embodiments of the disclosure is provided. The honeycomb extrusion die 500 may be modified to manufacture the honeycomb structure 200. The honeycomb structures 100, 200 may be formed by extrusion of a plasticized batch, which is described, for example, in U.S. Pat. Nos. 3,885,977, 5,332,703, 6,391,813, 7,017,278, 8,974,724, WO2014/046912, and WO2008/066765, through the honeycomb extrusion die 500 to produce a green honeycomb structure (not shown). The green honeycomb structure may then be dried, such as described in U.S. Pat. Nos. 9,038,284, 9,335,093, 7,596,885, and 6,259,078, for example. The green honeycomb structure may then be fired, such as described in U.S. Pat. Nos. 9,452,578, 9,446,560, 9,005,517, 8,974,724, 6,541,407, and U.S. Pat. No. 6,221,308 to form one of the honeycomb structures 100, 200 including the geometry and microstructure described herein.

The honeycomb extrusion die 500 comprises a die body 539, a die inlet face 542 configured to receive ceramic or ceramic-forming mixture, and a die outlet face 547 opposite from the die inlet face 542 configured to extrude the mixture in the form of a self-supporting green honeycomb. The honeycomb extrusion die 500 may be coupled to an extruder (not shown) that receives the mixture, such as a twin-screw extruder, wherein the extruder forces the mixture under pressure through the honeycomb extrusion die 500.

The honeycomb extrusion die 500 comprises a plurality of feedholes 545 (a few labeled) extending from the die inlet face 542 into the die body 539 and intersecting with an array of slots 548 (a few labeled) extending into the die body 539 from the die outlet face 547 and connecting with the plurality of feedholes 545. The feedholes 545 supply the forming mixture to the array of slots 548. The intersecting array of slots 548 comprises radial slots 550 and tangential slots 552. The radial slots 550 (a few labeled in FIG. 5A) are arranged to diverge from one another with respect to a central axis 551 as the radial slots 550 extend toward an outermost periphery of the honeycomb extrusion die 500. Tangential slots 552 (a few labelled) may, in some embodiments, be substantially straight. The tangential slots 552 may be arranged concentrically with respect to the central axis 551.

Within the honeycomb extrusion die 500, at least one of the tangential slots 552 is a tangential transition slot 543 and is located between two adjacent radial slots 558, 560. Further, the extrusion die comprises at least one transition structural component 540 located radially inward from the tangential transition slot 543, wherein the at least one transition structural component 540 comprises a first inclined slot 544 having a first end coupled to a first radial slot 558 and a second inclined slot 546 having a first end coupled to a second radial slot 560. The second end of the first inclined slot 544 and the second end of the second inclined slot 546 may be connected to a radially-extending web 556, which in turn may be connected to the transition slot 543.

The honeycomb extrusion die 500 may optionally comprise a skin-forming portion 500S formed by a skin-forming component or mask 549 (e.g., a ring-shaped article) that is coupled to the die body 539 and that interfaces with skin forming feedholes 545S to include a skin 112 (FIG. 1) on the extruded green honeycomb structure formed during the extrusion method. A similar extrusion die setup may be used to form an extrusion die for a honeycomb body 20 comprising honeycomb structure 200, by changing the die slot configuration to correspond to the structure of the honeycomb structure 200 shown and described with reference to FIG. 2A-2B.

The foregoing description discloses example embodiments of the disclosure. Modifications of the above-disclosed apparatus, systems, and methods which fall within the scope of the disclosure will be readily apparent to those of ordinary skill in the art. Accordingly, while the present disclosure has been disclosed in connection with example embodiments, it should be understood that other embodiments may fall within the scope of the disclosure, as defined by the claims.

What is claimed is:

1. A honeycomb body comprising a honeycomb structure comprised of:
   a plurality of interconnected webs defining a plurality of cell channels in a honeycomb matrix having a central axis orthogonal to its transverse cross section, the plurality of interconnected webs comprising:
   radial webs arranged to diverge from one another with respect to the central axis as the radial webs extend toward an outermost periphery of the honeycomb structure, the radial webs comprising a first radial web and a second radial web;
   tangential webs arranged concentrically with respect to the central axis, wherein at least one of the tangential webs is a tangential transition web and is located between two adjacent radial webs; and
   at least one transition structural component located radially inward from the tangential transition web, wherein the at least one transition structural component comprises a first inclined web having a first end coupled to the first radial web and a second inclined web having a first end coupled to the second radial web;
   wherein the at least one transition structural component is adjacent the first radial web and is adjacent the second radial web, the at least one transition structural component comprises a first inclined web having a first end coupled to the first radial web at an inclined angle which is less than ninety degrees, and a second inclined web having a first end coupled to the second radial web at an inclined angle which is less than ninety degrees.

2. The honeycomb body of claim 1, wherein the at least one transition structural component comprises a radially-extending web having a first end and a second end, the first end coupled to the tangential transition web and the second end coupled to a second end of the first inclined web and a second end of the second inclined web.

3. The honeycomb body of claim 2, wherein the at least one transition structural component is devoid of a tangential web extending between the first end of the first inclined web and the first radial web and the first end of the second inclined web and the second radial web.

4. The honeycomb body of claim 1, further comprising an inner tangential web extending between the first end of the first inclined web and the first end of the second inclined web.

5. The honeycomb body of claim 4, wherein the first inclined web has a second end, wherein the second inclined web has a second end, wherein the second end of the first inclined web is coupled to the tangential transition web, and wherein the second end of the second inclined web is coupled to the tangential transition web.

6. The honeycomb body of claim 5, wherein the second end of the first inclined web and the second end of the second inclined web are coupled to the same location on the tangential transition web.

7. The honeycomb body of claim 1, wherein the first inclined web has a thickness approximately equal to a thickness of at least one tangential web.

8. The honeycomb body of claim 1, wherein a first number of cell channels is in a first ring of cell channels centered about the central axis and on a first side of the at least one transition structural component and a second number of cell channels is in a second ring of cell channels centered about the central axis and on a second side of the at least one transition structural component.

9. The honeycomb body of claim 1, wherein at least one of the tangential webs is straight between two adjacent radial webs.

10. The honeycomb body of claim 1, wherein at least one plurality of tangential webs is arranged concentrically with respect to the central axis, and wherein all tangential webs of the at least one plurality of tangential webs are straight.

11. The honeycomb body of claim 1, comprising an outermost ring of tangential webs having inner surfaces facing the central axis, at least one inner surface of the outermost ring of tangential webs being concave.

12. The honeycomb body of claim 1, wherein at least one of the radial webs extends from the central axis to an outermost periphery of the honeycomb matrix.

13. The honeycomb body of claim 1, the first inclined web and the second inclined web are continuous curved web.

14. The honeycomb body of claim 1, wherein at least one radial web and at least one tangential web have thicknesses of less than 0.38 mm.

15. The honeycomb body of claim 1, wherein at least one radial web and at least one tangential web have thicknesses of greater than 0.025 mm.

16. The honeycomb body of claim 1, wherein the first inclined web intersects the first radial web at an angle that is the same as an angle that the second inclined web intersects the second radial web.

17. A honeycomb body comprising a honeycomb structure comprised of:
a plurality of interconnected webs defining a plurality of cell channels in a honeycomb matrix having a central axis orthogonal to its transverse cross-section, the plurality of interconnected webs comprising:
radial webs arranged to diverge from one another with respect to the central axis as the radial webs extend toward an outermost periphery of the honeycomb structure, the radial webs comprising a first radial web and a second radial web; and
tangential webs arranged concentrically with respect to the central axis, wherein at least one of the tangential webs is a tangential transition web and is located between two adjacent radial webs; and
at least one transition structural component bounded by the tangential transition web, the first radial web, and the second radial web, wherein the at least one transition structural component comprises:
a first inclined web having a first end and a second end, wherein the first end is coupled to the first radial web;
a second inclined web having a first end and a second end, wherein the first end is coupled to the second radial web; and
a radially-extending web having a first end and a second end, the first end coupled to the tangential transition web and the second end coupled to the second end of the first inclined web and the second end of the second inclined web.

18. The honeycomb body of claim 17, wherein the at least one transition structural component is devoid of a tangential web extending between the first end of the first inclined web and the first radial web and the first end of the second inclined web and the second radial web.

19. The honeycomb body of claim 17, wherein the first inclined web has a thickness approximately equal to a thickness of at least one tangential web.

20. An extrusion die configured to manufacture a honeycomb body, the body comprising:
an outlet face of a die body having a central axis orthogonal to the outlet face and comprising a matrix of intersecting slots comprising:
radial slots arranged to diverge from one another with respect to the central axis as the radial slots extend toward an outermost periphery of the die body, the radial slots comprising a first radial slot and a second radial slot;
tangential slots arranged concentrically with respect to the central axis, wherein at least one of the tangential slots is a tangential transition slot and is located between two adjacent radial slots; and
at least one transition structural component located radially inward from the tangential transition slot, wherein the at least one transition structural; wherein the at least one transition structural component is adjacent the first radial web and is adjacent the second radial web, the at least one transition structural component comprises a first inclined web having a first end coupled to the first radial web at an inclined angle which is less than ninety degrees, and a second inclined web having a first end coupled to the second radial web at an inclined angle which is less than ninety degrees.

* * * * *

UNITED STATES PATENT AND TRADEMARK OFFICE
CERTIFICATE OF CORRECTION

PATENT NO. : 11,280,238 B2
APPLICATION NO. : 16/642422
DATED : March 22, 2022
INVENTOR(S) : Amit Halder It is certified that error appears in the above-identified patent and that said Letters Patent is hereby corrected as shown below:

On the Title Page

In item (73), in Column 1, "Assignee", Line 1, delete "Corning, Incorporated," and insert -- Corning Incorporated, --.

In item (56), in Column 2, under "Other Publications", Line 3, delete "Document));" and insert -- Document); --.

Signed and Sealed this
First Day of August, 2023

Katherine Kelly Vidal
*Director of the United States Patent and Trademark Office*